(12) United States Patent
Hergott et al.

(10) Patent No.: US 7,179,161 B2
(45) Date of Patent: Feb. 20, 2007

(54) METHOD AND APPARATUS FOR VERTICALLY STUFFING CASINGS WITH SAUSAGE EMULSION

(75) Inventors: Steven P. Hergott, Ankeny, IA (US); David S. Hamblin, Norwalk, IA (US); Michael J. Hardy, West Des Moines, IA (US)

(73) Assignee: Stork Townsend Inc., Des Moines, IA (US)

( * ) Notice: Subject to any disclaimer, the term of this patent is extended or adjusted under 35 U.S.C. 154(b) by 708 days.

(21) Appl. No.: 10/682,475

(22) Filed: Oct. 9, 2003

(65) Prior Publication Data

US 2005/0079272 A1   Apr. 14, 2005

(51) Int. Cl.
*A22C 11/02* (2006.01)
(52) U.S. Cl. .............................. 452/46; 53/567; 53/576; 53/459
(58) Field of Classification Search ................. 452/21, 452/22, 30–32, 35, 37, 46–48, 51; 53/451, 53/459, 480, 549, 567, 576
See application file for complete search history.

(56) References Cited

U.S. PATENT DOCUMENTS

| | | | |
|---|---|---|---|
| 990,547 A | 4/1911 | Gunuskey | |
| 1,395,967 A | 11/1921 | Merli et al. | |
| 2,257,433 A * | 9/1941 | Stokes | 53/451 |
| 2,568,491 A | 9/1951 | Edwards | |
| 3,150,410 A | 9/1964 | Washburn | |
| 3,195,176 A | 7/1965 | Washburn | |
| 3,253,297 A | 5/1966 | Nuckles | |
| 3,404,430 A | 10/1968 | Kielsmeier et al. | |
| 3,480,449 A | 11/1969 | Sumption | |
| 3,672,001 A | 6/1972 | Greider | |
| 3,805,329 A | 4/1974 | Kollross | |
| 3,805,480 A | 4/1974 | Cherio et al. | |
| 3,826,852 A | 7/1974 | Levaco et al. | |
| 3,952,370 A | 4/1976 | Greider | |
| 3,964,236 A | 6/1976 | Smith | |
| 4,112,546 A | 9/1978 | Muller | |
| 4,202,075 A | 5/1980 | Michel et al. | |
| RE30,390 E | 9/1980 | Kupcikevicius et al. | |
| 4,257,146 A | 3/1981 | Karp | |
| 4,434,527 A | 3/1984 | Staudenrausch et al. | |
| 4,437,209 A | 3/1984 | Durvon | |
| 4,438,545 A | 3/1984 | Kupcikevicius et al. | |
| 4,489,460 A | 12/1984 | Nausedas | |
| 4,525,895 A | 7/1985 | Raudys | |
| 4,563,231 A * | 1/1986 | Porrmann et al. | 156/90 |
| 4,580,316 A | 4/1986 | Gunter | |
| 4,593,433 A | 6/1986 | Nausedas | |
| 4,642,848 A | 2/1987 | Kollross | |

(Continued)

FOREIGN PATENT DOCUMENTS

DE        1136604        9/1962

(Continued)

*Primary Examiner*—Thomas Price

(57) ABSTRACT

A machine and method for encasing sausages by having a stuffing tube that is vertically disposed in order to allow gravity to help in the sausage making process. A conical shaped restricting device is attached to the stuffing tube to help facilitate the movement of the casing into a twisting mechanism and to ensure bunching in the casing is reduced. The casing is then fed through the twisting mechanism and into a linker.

4 Claims, 1 Drawing Sheet

U.S. PATENT DOCUMENTS

| | | | |
|---|---|---|---|
| 4,649,602 A | 3/1987 | Kupcikevicius | |
| 4,683,617 A | 8/1987 | Raudys | |
| 4,768,261 A | 9/1988 | Nakamura | |
| 4,893,377 A | 1/1990 | Evans et al. | |
| 4,970,758 A | 11/1990 | Naples et al. | |
| 4,991,260 A | 2/1991 | Nausedas | |
| 5,046,219 A | 9/1991 | Stanley | |
| 5,092,814 A | 3/1992 | Kasai et al. | |
| 5,147,239 A | 9/1992 | Staudenrausch | |
| 5,170,609 A * | 12/1992 | Bullock et al. | 53/434 |
| 5,273,482 A | 12/1993 | Beckman et al. | |
| 5,297,983 A | 3/1994 | Mueller et al. | |
| 5,352,151 A | 10/1994 | Piereder | |
| 5,354,228 A | 10/1994 | Smith et al. | |
| 5,399,213 A | 3/1995 | Oxley | |
| 5,743,792 A | 4/1998 | Hanten et al. | |
| 5,813,200 A * | 9/1998 | Jacoby et al. | 53/567 |
| 5,813,906 A | 9/1998 | Phillips | |
| 5,830,050 A | 11/1998 | Nakamura et al. | |
| 5,842,914 A | 12/1998 | Vermeer et al. | |
| 6,050,888 A | 4/2000 | Nakamura et al. | |
| 6,056,635 A | 5/2000 | Vermeer et al. | |
| 6,066,035 A | 5/2000 | Hergott et al. | |
| 6,066,036 A | 5/2000 | Carollo | |
| 6,139,416 A | 10/2000 | Toepfer | |
| 6,341,473 B1 * | 1/2002 | Kovacs et al. | 53/450 |
| 6,524,177 B2 | 2/2003 | Bolzacchini | |
| 6,572,464 B1 | 6/2003 | Hergott et al. | |
| 6,585,580 B1 | 7/2003 | Hergott et al. | |
| 6,659,853 B1 | 12/2003 | Hergott et al. | |
| 6,659,854 B1 | 12/2003 | Hergott et al. | |
| 7,059,102 B2 * | 6/2006 | Hanten | 53/450 |

FOREIGN PATENT DOCUMENTS

| | | |
|---|---|---|
| DE | 4232759 | 3/1994 |
| DE | 29819328 U1 | 10/1998 |
| DE | 10001423 A1 | 1/2000 |
| EP | 0379123 | 7/1990 |
| FR | 2780246 | 12/1999 |

* cited by examiner

METHOD AND APPARATUS FOR VERTICALLY STUFFING CASINGS WITH SAUSAGE EMULSION

BACKGROUND OF THE INVENTION

Sausages have been traditionally made by filling the natural intestines of sheep and other animals with a sausage product whereupon the filled natural casing was formed into links for cooking. At more modern times, sausages are predominantly made by introducing an emulsion into an artificial casing, which in cases the sausage material through linking and preliminary cooking. Machines for making sausages with artificial casings have a high volume capability (up to 30,000 sausages per hour). Efforts have been made to use these high speed machines with natural casings. However, because of the nature of the natural casings, including the relatively shorter and variable length and non uniform diameter, modern sausage encasing machines have not achieved the volume and capacity with natural casings as they do with artificial casings.

It is therefore a principal object of this invention to provide a machine for encasing sausages that improves upon the state of the art.

A further object of this invention is to provide a sausage encasing machine that is vertically aligned to allow gravity to enhance the movement of the casing.

Yet a further object of this invention is to reduce bunching of the casings.

These and other objects will be apparent to those skilled in the art.

BRIEF SUMMARY OF THE INVENTION

A machine for encasing sausages that has a vertically disposed stuffing tube. The vertically disposed stuffing tube has a lower discharge end, a means for rotating the stuffing tube, and a means for moving upward and downward. The machine also consists of a twister mechanism and a linker. A conical shaped restricting device is located at the lower portion of the tube and aids in straightening the casing out before it enters the twister. Because the sausage encasing machine is set up vertically, the movement of the shirred casing is enhanced by gravity.

DESCRIPTION OF THE EMBODIMENTS OF THE INVENTION

Figure 1:
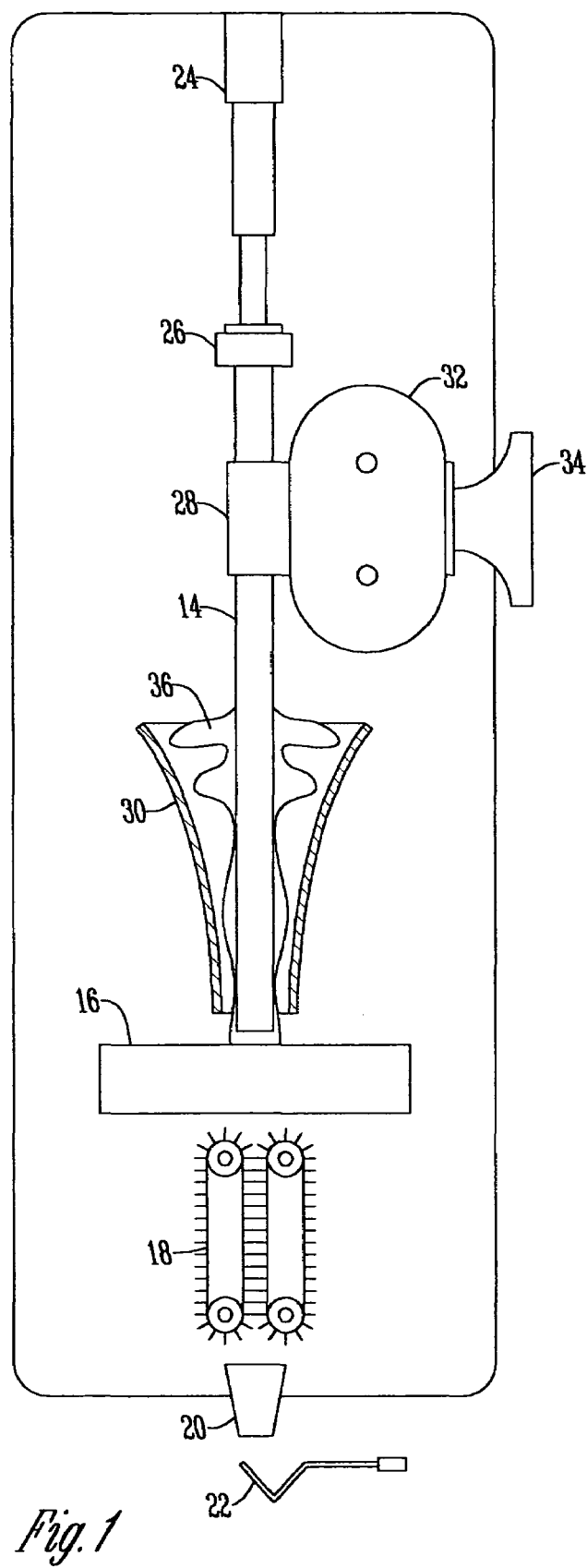
FIG. 1 is a side view of a sausage making machine showing the conventional components modified by this invention having a sectional view of the conical shaped restricting device.

The term "emulsion" as used herein includes meat or any other such edible substance.

With reference to FIG. 1, a sausage making machine 10 has a frame 11, and a slidable stuffing tube 14. The sausage making machine 10 further has a twisting mechanism 16, a linking mechanism 18, a discharge horn 20, and a conveyor 22.

The sausage encasing machine 10 is set up in a vertical plane. The sausage machine 10 has an air cylinder 24 that is operably connected to both a rotator 26 and a stuffing block 28 and is attached to the stuffing tube 14. At the end of the stuffing tube 14 is a conical shaped restricting device 30 that is attached to the twister mechanism 16. Connected to the stuffing block 28 is a metering pump 32 and a source 34.

In operation the meat emulsion is pumped from the source 34 through the metering pump 32 into the stuffing block 28. The emulsion then proceeds to stuffing tube 14 and into a casing 36. The casing 36 is then guided off the tube 14 and into the twister mechanism 16 by passing through the conical shaped restricting device 30. Because gravity assists in feeding the casing 36, and hence the restrictor 30, the casing is straightened by the restrictor 30 before entering the twister mechanism 16, thus reducing bunching in the casing 36. If needed, water from a water source may be sprayed into the restrictor 30 to help the casing 36 more easily slide through the restrictor 30. After the casing 36 slides through the restrictor 30 it then proceeds through to twister mechanism 16, then into linking mechanism 18, down to discharge horn 20 and finally engages conveyor 22.

It will be appreciated by those skilled in the art that other various modifications could be made to the device without the parting from the spirit in scope of this invention. All such modifications and changes fall within the scope of the claims and are intended to be covered thereby.

What is claimed is:

1. A machine for encasing sausages, comprising:
   a vertically disposed stuffing tube having a lower discharge end, means for moving the tube upwardly and downwardly,
   the lower end of the stuffing tube extending into a twister mechanism,
   a linker disposed below the twister mechanism,
   a conical shaped restricting device rotatably surrounding a lower portion of the tube with a lower diameter of the restricting device being slightly greater than the outside diameter of the tube, and
   a shirred casing around the tube and terminating in the lower end of the restricting device so that gravity feeds the casings from the restricting device before entering the twister so that the restricting device reduces any bunching of the casing.

2. The machine of claim 1 wherein means are provided for spraying a fluid into the restricting device to facilitate the passing of the casing therethrough.

3. The method of encasing sausages steps comprising:
   feeding emulsion into a vertically disposed stuffing tube;
   advancing the emulsion into a shirred casing that is around the stuffing tube and terminates in the lower end of a conical shaped restricting device having a lower diameter greater than the outside diameter of the tube; and
   advancing the casing through the restricting device and into a twister mechanism using gravity so that the restricting device reduces bunching of the casing.

4. The method of claim 3 further comprising the step of:
   spraying fluid into the restricting device to facilitate the passing of the casing therethrough.

* * * * *